US010450209B2

(12) United States Patent
Dulko

(10) Patent No.: US 10,450,209 B2
(45) Date of Patent: *Oct. 22, 2019

(54) STABLE SALT-FREE POLYALUMINUM CHLOROSULFATES

(71) Applicant: USALCO, LLC, Baltimore, MD (US)

(72) Inventor: James M. Dulko, Pasadena, MD (US)

(73) Assignee: USALCO, LLC, Baltimore, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/882,748

(22) Filed: Jan. 29, 2018

(65) Prior Publication Data

US 2018/0148359 A1     May 31, 2018

Related U.S. Application Data

(63) Continuation-in-part of application No. 15/478,485, filed on Apr. 4, 2017, now Pat. No. 9,878,929, which is a continuation of application No. 14/333,963, filed on Jul. 17, 2014, now Pat. No. 9,611,155.

(60) Provisional application No. 61/847,383, filed on Jul. 17, 2013.

(51) Int. Cl.
    *C02F 1/52*     (2006.01)
    *B01D 21/01*     (2006.01)
    *C02F 103/28*     (2006.01)
    *C02F 103/34*     (2006.01)

(52) U.S. Cl.
CPC ............ *C02F 1/5236* (2013.01); *B01D 21/01* (2013.01); *C02F 1/5245* (2013.01); *C02F 2103/28* (2013.01); *C02F 2103/343* (2013.01)

(58) Field of Classification Search
CPC .................................................... C02F 1/5236
See application file for complete search history.

(56) References Cited

U.S. PATENT DOCUMENTS

| | | | |
|---|---|---|---|
| 3,270,001 A | 8/1966 | Morimoto et al. | |
| 3,497,459 A | 2/1970 | Nakamura et al. | |
| 3,544,476 A | 12/1970 | Aiba et al. | |
| 3,929,666 A | 12/1975 | Aiba et al. | |
| 4,069,299 A * | 1/1978 | Hodgson | C01F 7/56 423/437.1 |
| 4,450,092 A * | 5/1984 | Huang | C02F 1/54 210/725 |
| 4,981,673 A | 1/1991 | Boutin et al. | |
| 5,076,940 A | 12/1991 | Boutin et al. | |
| 5,215,245 A * | 6/1993 | Moyer | B21B 1/227 228/152 |
| 5,246,686 A | 9/1993 | Cuer et al. | |
| 5,348,721 A | 9/1994 | Murphy et al. | |
| 5,381,172 A | 1/1995 | Ujita et al. | |
| 5,518,706 A * | 5/1996 | Boutin | C01F 7/007 210/702 |
| 5,603,912 A | 2/1997 | Giovanniello et al. | |
| 5,879,651 A * | 3/1999 | Dufour | C01F 7/002 210/723 |
| 5,938,970 A * | 8/1999 | Reilly, Jr. | C01B 13/363 162/181.2 |
| 5,985,234 A * | 11/1999 | Dulko | C01F 7/007 210/702 |
| 5,997,838 A * | 12/1999 | Dulko | C01F 7/007 210/702 |
| 6,036,935 A * | 3/2000 | Dulko | C01F 7/007 210/716 |
| 6,548,037 B1 | 4/2003 | Pozzoli | |
| 8,486,474 B2 * | 7/2013 | Sarir | C13B 20/06 426/533 |
| 9,611,155 B2 | 4/2017 | Dulko | |
| 9,878,929 B2 | 1/2018 | Dulko | |
| 10,040,072 B2 | 8/2018 | Wonder | |
| 2005/0266181 A1 * | 12/2005 | Bi | B41M 5/52 428/32.34 |
| 2006/0003891 A1 * | 1/2006 | Zhang | C02F 1/5245 502/303 |
| 2006/0013971 A1 * | 1/2006 | Chen | B41M 5/52 428/32.34 |
| 2007/0092433 A1 | 4/2007 | Janak et al. | |
| 2010/0061919 A1 | 3/2010 | Grove et al. | |
| 2010/0113320 A1 * | 5/2010 | Cumberland | C11D 1/662 510/437 |
| 2010/0150818 A1 * | 6/2010 | Haase | C02F 1/50 423/580.1 |
| 2011/0003097 A1 * | 1/2011 | Chen | B41M 5/504 428/32.21 |
| 2011/0165303 A1 | 7/2011 | Bushong et al. | |
| 2015/0021514 A1 * | 1/2015 | Dulko | C02F 1/5236 252/175 |

(Continued)

FOREIGN PATENT DOCUMENTS

| | | | |
|---|---|---|---|
| EP | 0779242 A2 | 6/1997 | |
| WO | 9711029 A3 | 3/1997 | |
| WO | WO-9711029 A3 * | 5/1997 | ............. C01F 7/007 |

OTHER PUBLICATIONS

Edwards et al., "Chloride-to-sulfate mass ratio and lead leaching to water," Journal AWWA, vol. 99, No. 7, pp. 96-109, Jul. 2007.

(Continued)

*Primary Examiner* — Nicole M. Buie-Hatcher
*Assistant Examiner* — M. Reza Asdjodi
(74) *Attorney, Agent, or Firm* — Sunstein Kann Murphy & Timbers LLP

(57) ABSTRACT

A process for producing a polyaluminum chlorosulfate (PACS) includes adding an aluminum hydroxychloride (AHC) solution having about 38-43% basicity with (1) aqueous aluminum sulfate to form a solution and mixing a solid AHC with the solution to form an aqueous milky suspension or (2) a solid AHC and solid aluminum sulfate and adding water to the solid mixture to form an aqueous milky suspension, and maintaining the milky suspension for a period sufficient to allow the milky suspension to form a clear to slightly turbid solution including the PACS, the PACS having a basicity of 55 to 75%, the average molecular weight of the PACS is greater than or equal to 95 and less than or equal to 111, and salts present in the PACS comprise 0-1.0% sodium chloride by weight and 0-1.0% sodium sulfate by weight.

20 Claims, No Drawings

(56) References Cited

U.S. PATENT DOCUMENTS

2016/0074873 A1 3/2016 Wonder
2016/0244345 A1 8/2016 Dulko
2017/0203981 A1 7/2017 Dulko

OTHER PUBLICATIONS

European Patent Office, Partial Supplementary European Search Report, Application No. 148263643, 6 pages, dated Jan. 24, 2017.
International Searching Authority, International Search Report and Written Opinion, International Application No. PCT/US2014/046991, 20 pages, dated Dec. 15, 2014.
International Search Repor—International Application No. PCT/US19/015628 dated Apr. 24, 2019, together with the written Opinion of the International Searching Authority, 12 pages.

\* cited by examiner

STABLE SALT-FREE POLYALUMINUM CHLOROSULFATES

CROSS-REFERENCE TO RELATED APPLICATIONS

This patent application is a continuation-in-part application of U.S. patent application Ser. No. 15/478,485 filed on Apr. 4, 2017, now U.S. Pat. No. 9,878,929, which is a continuation application of U.S. patent application Ser. No. 14/333,963 filed on Jul. 17, 2014, now U.S. Pat. No. 9,611,155, which claims the benefit of U.S. Provisional Patent Appl. No. 61/847,383 filed Jul. 17, 2013, the disclosures of which are incorporated by reference herein in their entirety.

TECHNICAL FIELD

The present invention is directed to polyaluminum chlorosulfates (PACSs) and methods of making and using them.

BACKGROUND ART

Polyaluminum chlorides (PACls) and polyaluminum chlorosulfates (PACSs) are used in water treatment and in the production of paper, antiperspirants, foods and pharmaceuticals. In wastewater treatment processes, they serve as flocculants and coagulants. Processes for producing polyaluminum chlorides and polyaluminum chlorosulfates with characteristics favorable for water treatment have been described in a number of previous publications, including: U.S. Pat. Nos. 5,246,686; 4,981,673; 5,076,940; 3,929,666; 5,348,721; 6,548,037; 5,603,912; and 5,985,234.

Low basicity PACls (0-45% basicity) are very stable in solution but can also be very corrosive. They tend to form small flocs, depress pH and require a high concentration relative to other products used in water treatment. High basicity PACls (45-75% basicity) are somewhat better as coagulants in water treatment, but can cost more to manufacture and have a limited shelf life. Highly basic aluminum chlorohydrate (83% basicity) solves most issues of its lower basicity counterparts, but is not effective as a coagulant in cold water or highly turbid water.

In contrast, PACSs are highly efficient coagulants and work well in either cold or highly turbid waters. The main problem with these compounds is that they have a limited shelf life and degrade rapidly at elevated temperatures. PACSs may be made by shearing sodium aluminate into a basic aluminum chlorosulfate solution. However, this produces as much as 5-10% byproduct sodium chloride and sodium sulfate which becomes an impurity in water treatment. operations and results in an elevation of the chloride and sodium content of the treated waters. The by-product salts also reduce the concentration of the PACSs and shorten the shelf life of these products.

As an alternative, PACS may be made by mixing lime with a mixture of aluminum chloride and aluminum sulfate solutions. In this case, by-product calcium sulfate or gypsum are produced which need to be disposed of. It is also difficult to produce basicities of greater than 50% using this technology.

As mentioned previously, solutions of PACls or PACSs are often used in water treatment procedures. However, waters with a high chloride-to-sulfate mass ratio (CSMR) can cause galvanic corrosion of solder and thereby create higher lead levels in drinking water (Edwards, et al., *JAWWA* 99(7):96-109 (July 2007)). Use of all chloride PACls and low sulfate PACS can make this problem worse, as can PACSs that contain by-product sodium chloride.

SUMMARY OF THE INVENTION

The present invention is directed to polyaluminum chlorosulfates (PACSs) that are high in basicity and that have a high percentage by weight of sulfate. The PACSs are made by adding solid aluminum hydroxychloride to an aqueous solution of aluminum sulfate or by diluting a mixture of solid, dry aluminum sulfate and aluminum hydroxychloride with water. The invention includes methods of using the PACS formed by these procedures in the treatment of water as well as packages containing dry aluminum hydroxychloride and aluminum sulfate as either separate components or as a mixture.

The present invention is based upon the development of methods for producing polyaluminum chlorosulfates (PACS) that have a high percentage by weight of sulfate, a high basicity and low levels of sodium chloride and sodium sulfate. Importantly, the methods involve the use of two components, aluminum sulfate and aluminum hydroxychloride, that can be maintained in a dry, solid state until immediately before they are used in making PACSs. As a result, these components can be shipped dry (in either a mixed or unmixed form) without transporting water and are less susceptible to degradation by heat. Water treatment compositions containing the PACS of the invention work efficiently in cold or turbid water and are effective in a broad pH range. Finally, because the PACSs of the invention have a high sulfate to mass ratio, they are less likely to contribute to high lead levels in drinking water than PACS with a low ratio.

In its first aspect, the invention is directed compositions comprising PACSs having a sulfate content of 0.5% to 13% by weight or greater for the product in solution, or 2%-30% by weight for the dry product, and a basicity of 65%-70% for a first embodiment or a basicity of 58%-62% for a second embodiment. These compositions are further characterized by having less than 1.0%, preferably less than 0.5% or less than 0.2%, and most preferably less than 0.1% of sodium chloride and less than 1.0%, preferably less than 0.5% or less than 0.2%, and most preferably less than 0.1% sodium sulfate by weight. The PACS of the invention have the formula: $Al(OH)_xCl_{(3-x-2y)}(SO_4)_y$, (formula I), in which:

x is 1.78 to 2.02;
y is 0.03 to 0.45;
x+y/2 is 1.8 to 2.1;
the ratio of Al to $SO_4$ is 2 to 34; the ratio of Al to Cl is 0.9 to 3.0; and the ratio of Al to OH is 0.5 to 0.6;
basicity is 55 to 70%; and
the average molecular weight is greater than or equal to 95 and less than or equal to 111.

Preferred PACSs of formula I may be characterized as follows:

PACS1: $x=1.78-1.82$; $3-x-2y=0.35-1.1$; $y=0.065-0.45$; and $x+y/2=1.83-2.02$;

PACS2: $x=1.95-2.02$; $3-x-2y=0.6-1.0$; $y=0.03-0.20$; and $x+y/2=1.95-2.1$.

In another embodiment, the invention is directed to a process for producing the compositions described above and comprising the steps of: a) adding 55-83% basic solid aluminum hydroxychloride to an aqueous aluminum sulfate solution to form a milky suspension; and b) maintaining the milky suspension for a period sufficient (generally from 2-16 hours, preferably 3 to 6 hours) to form a clear solution. The process should be carried out at a temperature below 50 degrees centigrade (e.g., at 5-50 degrees centigrade), and preferably at 10-40 degrees centigrade, and most preferably around 20-25 degrees centigrade. The aqueous aluminum sulfate solution used in the process may also be made by dissolving solid aluminum sulfate in water after the addition of the basic solid aluminum hydroxychloride. On a dry weight basis, the ratio of aluminum hydroxychloride to aluminum sulfate should typically be 0.75-20 parts aluminum hydroxychloride to 1 part aluminum sulfate. For example, 0.75-20 parts of dry aluminum hydroxychloride may be added for each one part of dry aluminum sulfate. Other ranges include 5.0-10.0 parts of dry aluminum hydroxychloride for each part of dry aluminum sulfate and 10.0-20 parts of dry aluminum hydroxychloride for each part of dry aluminum sulfate. The clear solution produced is, optionally, formed by mixing the milky suspension while gradually increasing its temperature.

Compositions may also be made by: a) dissolving a mixture of solid aluminum sulfate and solid aluminum hydroxychloride in water to form a milky suspension; and then b) maintaining the milky suspension for a period sufficient to allow the suspension to form a clear solution. The process should preferably be carried out at the temperatures indicated above and the solid aluminum sulfate may be dissolved in water before adding the solid aluminum hydroxychloride. The same ratios of aluminum hydroxychloride to aluminum sulfate discussed above may be used.

In another aspect, the invention is directed to a package, e.g., bags or drums, comprising two components, solid dry aluminum sulfate and solid dry aluminum hydroxychloride, that can be used to form a coagulant PACS for wastewater treatment. The package may take the form of a single container having solid aluminum sulfate and solid aluminum hydroxychloride in the form of a dry mixture (e.g, solid aluminum hydroxychloride having less than 3 waters of hydration). The ratio of solid aluminum sulfate to solid aluminum hydroxychloride in the mixture is such that, by adding water, a solution may be formed comprising PACS of formula (I):

$$Al(OH)_xCl_{(3-x-2y)}(SO_4)_y \quad (I),$$

in which:
x is 1.78 to 2.02;
y is 0.03 to 0.45;
x+y/2 is 1.8 to 2.1;
the ratio of Al to SO4 is 2 to 34; the ratio of Al to Cl is 0.9 to 3.0; and the ratio of Al to OH is 0.5 to 0.6;
the basicity is 55 to 70%; and
the average molecular weight is greater than or equal to 95 and less than or equal to 111; and
the solution comprises less than 0.1% sodium chloride by weight and less than 0.1% sodium sulfate by weight.

In terms of dry weights of solid aluminum sulfate and solid aluminum hydroxychloride in the dry mixtures present in packages, a ratio of 0.75-20 parts dry aluminum hydroxychloride to 1 part dry aluminum sulfate may be used. Examples of ranges include: 0.75-5.0 parts of dry aluminum hydroxychloride to one part of dry aluminum sulfate; 5.0-10.0 parts of dry aluminum hydroxychloride for each part of dry aluminum sulfate; and 10.0-20.0 parts of dry aluminum hydroxychloride for each part of dry aluminum sulfate.

In preferred embodiments, solutions are formed containing PACS 1, or 2, in which the parameters of formula (I) are as follows:

PACS1: x=1.8-1.9; 3-x-2y=0.72-0.78; y=0.18-0.22; and x+y/2=1.9-2.0;

PACS2: x=2.0-2.3; 3-x-2y=0.6-1.0; y=0.01-0.10; and x+y/2=2.0-2.4.

In another aspect, the invention encompasses a method of treating water to remove impurities by adding a sufficient amount of a PACS described above to the water to coagulate and flocculate impurities and subsequently separating the water from the coagulated or flocculated material. The amount of PACS required may be determined using procedures well known in the art and separation may be achieved by standard procedures such as allowing coagulated or flocculated materials to sediment and/or employing filtration methods.

Starting with solid, dry components, the overall procedure involves forming an aqueous solution from solid aluminum sulfate and solid aluminum hydroxychloride (as discussed above) and then adding this to wastewater to coagulate impurities. For example, in a preferred embodiment, the process includes: a) dissolving solid aluminum sulfate in water to form a solution; b) mixing solid 62-83% basic aluminum hydroxychloride into the aluminum sulfate solution formed in step a) to form a milky suspension comprising PACS; c) maintaining the milky suspension for a period sufficient to allow the suspension to form a clear solution; and d) adding the clear solution of step c) to wastewater to coagulate or flocculate impurities.

The PACS used in the water treatment procedures should have the characteristics described above. Specifically, the PACS should have formula:  $Al(OH)_xCl_{(3-x-2y)}(SO_4)_y$, (I), wherein: x is greater than or equal to 1.78 and less than or equal to 2.02; y is greater than or equal to 0.03 and less than or equal to 0.45; x+y/2 is greater than or equal to 1.83 and less than or equal to 2.02; and the basicity is from 55% to 70%. The preferred molecular weight for the PACS is greater than or equal to 95 and less than or equal to 111. Ratios of elements in the PACS may be: Al:SO4=2-34; Al:Cl=0.9-3.0; and Al:OH=0.5-0.6.

DEFINITIONS

Polyaluminum Chlorides or Basic Aluminum Chlorides: Polyaluminum chlorides are products of aluminum chloride hydroxide, $AlCl(OH)_2$, $AlCl_2(OH)$, and $Al_2Cl(OH)_5$. A representative formula is: $Al_2Cl_{6-n}(OH)_n$, where n=1 to 5.1. It is thought that, when these products are diluted, polymeric species such as: $Al_{13}O_4(OH)_{24}(H_2O)_{12}+7Cl$ are formed.

Polyaluminum Chlorosulfates or Basic Aluminum Chlorosulfates: These compounds can best be described by the formula: $Al(OH)_xCl_{(3-x-2y)}(SO_4)_y$ wherein x=1 to 2 and y is greater than 0 and less than or equal to 0.5. The polymeric species formed upon dilution may be expressed as: $Al_{13}O_4(OH)_{24}(H_2O)_{12}+5Cl+SO_4$.

Percent Basicity: As typically used in the art, percent basicity is defined as (% OH)(52.91)/(% Al). On a molar level, this may be expressed as ((OH)/(Al))/3 multiplied by 100. Thus, $Al(OH)(H_2O)_5+2Cl$ has a basicity of 33%. Basicities discussed in the text in connection with products made by the present procedure reflect formula basicities based upon hydroxide content.

Dry Aluminum Sulfate: This is a solid compound of crystallized, hydrated aluminum sulfate. It can be manufactured from aluminum oxide trihydrate, clays or bauxite. Typically, dry aluminum sulfate contains 14.3 waters of hydration, but 6.5 and 18 waters of hydration are also commercially available. These products typically have a small amount of aluminum hydroxide, usually less than 1% iron content (expressed as $Fe_2O_3$), and an amount of insolubles that varies depending on the manufacturer and grade. It is preferred to utilize aluminum sulfate manufactured from aluminum hydroxide to limit the impurities in a PACs product.

Aluminum Sulfate solutions: These are solutions of dry aluminum sulfate of approximately 48.5 wt % of the 14.3 hydrated aluminum sulfate. They are widely available commercially and can contain as much as 0.5% aluminum hydroxide and as much as 1% $Fe_2O_3$.

Solid aluminum hydroxychloride: These are compounds of the formula: $Al_2(OH)_n(Cl)_{6-n}\cdot zH_2O$, where n is greater than or equal to 3 and less than or equal to 5.1 and z is greater than zero and less than or equal to 3. The waters of hydration vary with basicity of the solid aluminum hydroxychloride, with waters of hydration decreasing as basicity increases. For example a 70% basic compound would have about 1.2 waters of hydration whereas an 80% basic compound would have about 0.5 waters of hydration. These compounds can be manufactured from decomposing aluminum chloride hexahydrate to the desired basicity.

DETAILED DESCRIPTION OF THE INVENTION

Polyaluminum Chlorosulfates

The present invention is directed to highly sulfated, high basicity polyaluminum chlorosulfate (PACS) compositions that have essentially no (less than 0.5%, and preferably less than 0.1% or 0.05%) by-product salts. These compositions are highly effective at removing impurities from water and wastewater. The PACS have the chemical formula:

$$Al(OH)_x Cl_{(3-x-2y)}(SO_4)_y, \quad \text{(formula I)},$$

where: 1.78≤x≤2.02; 0.03≤y≤0.45; and 1.8≤x+y/2≤2.1. Ratios are preferably: Al:$SO_4$=2 to 34 Al:Cl=0.9 to 3.0; and Al:OH=0.5 to 0.6 Basicity should be 55 to 70% by weight (defined as x/3n) and the molecular weight is preferably at least 95 and less than or equal to 111. Specific PACSs of the invention include: $Al(OH)_{1.83}Cl_{0.75}(SO_4)_{0.21}$; and $Al(OH)_{2.01}Cl_{0.93}(SO_4)_{0.03}$.

Processes of Making PACSs

The present invention includes a process for producing polyaluminumchlorosulfate by mixing dry, solid aluminum hydroxychloride into an aqueous solution of aluminum sulfate. The aluminum sulfate can be purchased commercially or made using processes well known in the art. Aluminum sulfate is manufactured by digesting an aluminum source (aluminum oxide trihydrate, bauxite, etc.) in a solution of approximately 50 wt % sulfuric acid. The mixture is reacted until there is a slight excess of aluminum hydroxide in solution.

Solutions of liquid aluminum sulfate appropriate for the making of PACSs may be prepared from a molten aluminum sulfate solution by diluting it to about 8.3% aluminum oxide content. Dry aluminum sulfate appropriate for the making of PACSs may be prepared by cooling molten aluminum sulfate and then grinding to the appropriate grind specification at a concentration of 17% aluminum oxide. This should be diluted with water to a final concentration of a 1 to 70 wt % equivalent of liquid aluminum sulfate in water prior to the addition of the solid aluminum hydroxychloride. The amount of water is dependent on the basicity of the solid aluminum hydroxychloride and the desired concentration of the PACS. If the PACS is going to be used on site it can be made as dilute as practical, but if it is going to be shipped elsewhere the concentration of the solution should be maximized. Solutions of PACS can be made as high as 20% aluminum oxide or higher. According to a first embodiment, the dry aluminum sulfate may be diluted to 70-100% equivalent of liquid aluminum sulfate in water prior to the addition of the solid aluminum hydroxychloride. According to a second embodiment, the dry aluminum sulfate may be diluted to 30 to 70% equivalent of liquid aluminum sulfate in water prior to the addition of the solid aluminum hydroxychloride. According to a third embodiment, the dry aluminum sulfate may be diluted to 4 to 30% equivalent of liquid aluminum sulfate in water prior to the addition of the solid aluminum hydroxychloride.

The solid aluminum hydroxychloride used in the making of PACSs can be produced by thermally decomposing aluminum chloride hexahydrate in a fluid bed dryer until the desired basicity is achieved. This process may be represented chemically as follows:

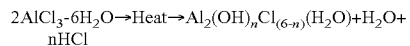

$$2AlCl_3\cdot 6H_2O \xrightarrow{Heat} Al_2(OH)_n Cl_{(6-n)}(H_2O)+H_2O+nHCl$$

The final basicity of the aluminum hydroxychloride should preferably be 62-83% basic, and should have waters of hydration of 0 to 1.5, preferably 0.5 to 1.2, and most preferably 0.8 to 1.2. It should be added to the aluminum sulfate solution while the solution is mixed using any of devices known in the art for this purpose.

Mixing of the solid aluminum hydroxychloride should continue until it has been mostly dissolved and until the final solution has a clear to slightly turbid appearance. When performed at about room temperature, this will typically take from 3 to 8 hours. If desired, the solution may be mildly heated to speed clarification but the temperature should preferably not exceed 50 degrees centigrade. In general, 10-40 degrees centigrade is a good range for carrying out the reaction at atmospheric pressure.

As an alternative, the PACSs of the invention can be made from a dry, solid mixture of aluminum sulfate and aluminum hydroxychloride. The aluminum hydroxychloride should have a basicity of 62-83% and may be present in the mixture, for example, at a ratio of between 40 grams per gram of aluminum sulfate and 2 grams per gram of aluminum sulfate. The mixture should be diluted with water to a final concentration of 20% to 40% PACS and mixed until all of the aluminum sulfate and aluminum hydroxychloride has been dissolved. All of the other parameters and procedures are the same as those described above.

The procedures described above should result in the formation of PACSs with a sulfate content of at least 0.5% by weight (e.g., 6-8%) and a basicity of 55% or greater (e.g., 58-75%). Most typically, the PACS solution will be added to raw water or wastewater to coagulate and remove impurities. Typically, the PACSs are mixed into raw water at dosage of 10 to 100 mg/L. The water is generally rapidly mixed with the PACS and then is slowly mixed for several minutes. Mixing is then stopped and the impurities that have been attracted to the PACS and are allowed to settle to the bottom of the water. The supernate is then filtered and proceeds through the rest of the treatment process. PACS can be used in wastewater treatment to remove phosphorous and/or impurities. When used for this, 50 to 300 mg of PACS is typically used per liter of wastewater.

Advantages

The highly sulfated PACSs of the present invention are highly effective as flocculants in water treatment procedures and should be less prone to increase lead levels in water than PACls or PACS with a lower percentage of sulfates. Typical high basicity PACSs are made by shearing sodium aluminate into a solution of basic aluminum chlorosulfates. Since these products degrade with temperature, the PACSs are partially decomposed by the heat from the shearing and the heat of neutralization between the alkaline aluminate and the acidic basic aluminum chlorosulfates. In contrast, the products of the present invention are manufactured at low temperatures thereby avoiding heat degradation. The PACSs are preferably made from solid components that can be shipped dry and reacted after receipt by a purchaser. This should reduce shipping costs, minimize degradation due to heat and/or storage, and allow end users to maintain larger stocks. The PACS described herein should be stable for long periods, work efficiently in cold or turbid water and be effective in a broad pH range.

The PACS described herein hydrolyze at different rates dependent on the sulfate to aluminum ratios. The higher the sulfate to aluminum ratio the quicker the hydrolysis rate. For very cold raw waters, that is less than 40° F., it may be desirable to formulate the PACS with high sulfate to aluminum ratios to speed up the rate of hydrolysis. This allows flocculation to occur in very cold waters. For waters that are very warm, it may be desirable to formulate a low sulfate to aluminum ratio, so that the hydrolysis will not occur too fast and not give a chance for the impurities in the water to bind to the PACS.

When producing a PACS having a basicity of about 60%, the sulfate to aluminum ratio is dependent on the basicity of the aluminum hydroxychloride (AHC) used to make the PACS. The process of decomposing aluminum chloride hexahydrate to produce AHC is described in more detail in U.S. Pat. No. 9,878,918, which is incorporate by reference herein in its entirety. In producing AHC, aluminum chloride hexahydrate may be decomposed at elevated temperatures by removing chloride from the molecule as hydrochloric acid and water. The following reactions detail the decomposition:

Hexahydrate Crystal (0% basic) $Al_2Cl_6 \cdot 12H_2O$

First step decomposition (16% basic) $Al_2(OH)Cl_5 \cdot 9H_2O + HCl + 3H_2O$

Second step decomposition (33% basic) $Al_2(OH)_2Cl_4 \cdot 7H_2O + HCl + 2H_2O$ Third step decomposition (50% basic) $Al_2(OH)_3Cl_3 \cdot 5H_2O + HCl + 2H_2O$ Fourth step decomposition (66% basic) $Al_2(OH)_4Cl_2 \cdot 3H_2O + HCl + 2H_2O$ Fifth step decomposition (83% basic) $Al_2(OH)_5Cl \cdot 0.5H_2O + HCl + 2.5H_2O$ (chlorohydrate)

Since a specific amount of energy is needed for each decomposition step, basicities in the middle of the decomposition steps may be difficult to obtain. However, an AHC produced with higher basicities, e.g., produced in the range between the fourth and fifth decomposition steps, may be desirable for specific applications. Embodiments of the present invention include an additional premixing process that allows for the production of PACS from a source of higher basicity AHC. In addition, this process allows a lower amount of aluminum sulfate to be utilized, producing a PACS with a lower sulfate to aluminum ratio, which may be desired in certain applications.

The premixing process includes adding a lower basicity aluminum hydroxychloride (AHC) material, either to the aluminum sulfate or to the higher basicity solid aluminum hydroxychloride material, in order to form a stable solution or a dry blended product that can then be used to form the PACS described herein. A lower basicity aluminum hydroxychloride material may include 8 to 18% aluminum oxide and 0 to 50% basicity, e.g., about 38%-43% basic aluminum hydroxychloride solution, and preferably about 40% basic. The lower basicity AHC may contain a stabilizer, such as sodium sulfate, sodium borate, phosphates and/or phosphoric acid. An aluminum hydroxychloride (AHC) in the higher basicity range includes 65% to 84% basicity, preferably about 73% to 83% basicity or 75% to 81% basicity, and may be made by the decomposition of aluminum chloride hexahydrate, as described in U.S. Pat. No. 9,878,918, which are powders of 40% to 60% aluminum oxide content.

For example, an aluminum hydroxychloride solution having about 38-43% basicity, and preferably about 40% basicity, may be added to an aluminum sulfate solution and then the solid aluminum hydroxychloride material with the higher basicity range may be dissolved in the solution of the aluminum sulfate and the aluminum hydroxychloride with a lower basicity to form an aqueous milky suspension. The ratio of the aluminum hydroxychloride to the aluminum sulfate, on a dry weight basis, is 0.75-20 parts aluminum hydroxychloride to 1 part aluminum sulfate. The milky suspension should be maintained for a period sufficient to allow the milky suspension to form a clear to slightly turbid solution, which includes the PACS described herein.

Alternatively, a dry blended product may be formed by mixing an aluminum hydroxychloride solution with a lower basicity range, e.g., having about 38-43% basicity and preferably about 40% basicity, with the solid aluminum hydroxychloride material with the higher basicity range. For example, blending may be accomplished by spraying the higher basicity solid aluminum hydroxychloride material with the lower basicity aluminum hydroxylchloride solution, e.g., in an apparatus such as a drying kiln, and then the sprayed solid aluminum hydroxychloride material may be dried, if needed. The resulting blend may then be dry blended with a solid aluminum sulfate. These blended powders are stable indefinitely and tolerate heat and freezing without degradation. The blended powder of the sprayed solid aluminum hydroxychloride material and solid aluminum sulfate may be dissolved in water to form an aqueous milky suspension. The ratio of the aluminum hydroxychloride to the aluminum sulfate, on a dry weight basis, is 0.75-20 parts aluminum hydroxychloride to 1 part aluminum sulfate. The milky suspension should be maintained for a period sufficient to allow the milky suspension to form a clear to slightly turbid solution, which includes the PACS described herein.

EXAMPLES

Example 1

In a 600 ml beaker, 130 grams of commercially available liquid aluminum sulfate (8.3% $Al_2O_3$) is diluted with 202 grams of water. The beaker is stirred on a magnetic stirrer to which is added 146 grams of a solid aluminum hydroxychloride (42% $Al_2O_3$, 71% basic) powder. The solution is allowed to mix for 24 hours after which the milky solution becomes clear. The solution yields a PACS solution of 15% $Al_2O_3$, 60.5% basic and 6.3% sulfate.

Example 2

In a pint jar, 350 grams of a solid aluminum hydroxychloride (41% $Al_2O_3$, 70% basic) powder is blended with 50 grams of dry alum (17% $Al_2O_3$). This produces a dry PACS of 38% $Al_2O_3$, 66% basic and 6% sulfate. Six months later the contents of the jar are added to a one liter beaker that contains 600 mls of water, while stirring on a magnetic stirrer. The solution is allowed to mix for 24 hours, after which the milky solution becomes clear. The solution yields a PACS solution of 15.2% $Al_2O_3$, 66.1% basic and 2.4% sulfate.

Example 3

Producing a Less Basic Aluminum Hydroxychloride (AHC) Solution

In a 2 liter beaker, 1600 g of aluminum hydroxyl chloride of 10.5% $Al_2O_3$ was heated to 160° F. with 1.4 grams of 85% phosphoric acid. 240 grams of 58% $Al_2O_3$ and 83% basicity was added to this solution. This produced less basic AHC of 16.7% $Al_2O_3$, 38% basicity.

Example 4

In a 600 milliter beaker, 104 grams of the less basic AHC produced in Example 3 was mixed with 129 grams of ambient temperature water. 30 grams of commercial liquid aluminum sulfate at 8.3% $Al_2O_3$ was added to this solution. 52 grams of higher basicity AHC powder (79.4% basic and 52.7% $Al_2O_3$) was then added to the solution and stirred for 6 hours. This produced a slightly hazy solution that after filtration yielded a clear solution of PACS of 15% $Al_2O_3$, 60% basic and 2.2% sulfate.

Example 5

In a 600 milliter beaker, 56 grams of the less basic AHC produced in Example 3 was mixed with 120 grams of ambient temperature water. 83 grams of commercial liquid aluminum sulfate at 8.3% $Al_2O_3$ was added to this solution. 60 grams of 79.4% basic and 52.7% $Al_2O_3$ AHC powder was then added to the solution and stirred for 6 hours. This produced a slightly hazy solution that after filtration yielded a clear solution of PACS of 15% $Al_2O_3$, 60% basic and 6.0% sulfate.

Example 6

30 grams of liquid aluminum sulfate was blended with 50.3 grams of water and 34.5 grams of liquid aluminum hydroxychloride (16.09% $Al_2O_3$ and 40% basicity). 27 grams of powdered aluminum hydroxychloride (52.7% $Al_2O_3$ and 79.35% basicity) was added to this solution. The solution was stirred until a slightly hazy solution resulted. After filtration, this yielded a PACS solution of 15.7% $Al_2O_3$, 60.9% basicity, 4.9% sulfate that was stable and clear for over 6 months.

Example 7

35 grams of liquid aluminum sulfate was blended with 53 grams of water and 25 grams of liquid aluminum hydroxychloride (17.5% $Al_2O_3$ and 41.7% basicity). 25 grams of powdered aluminum hydroxychloride (54.1% $Al_2O_3$ and 81.2% basicity) was added to this solution. The solution was stirred until a slightly hazy solution resulted. After filtration, this yielded a PACS solution of 15.1% $Al_2O_3$, 62.1% basicity, 5.7% sulfate that was stable and clear for over 6 months.

Example 8

35 grams of liquid aluminum sulfate was blended with 55 grams of water and 35 grams of liquid aluminum hydroxychloride (17.5% $Al_2O_3$ and 41.7% basicity). 25 grams of powdered aluminum hydroxychloride (54.1% $Al_2O_3$ and 81.2% basicity) was added to this solution. The solution was stirred until a slightly hazy solution resulted. After filtration, this yielded a PACS solution of 15.0% $Al_2O_3$, 60.5% basicity, 5.3% sulfate that was stable and clear for over 6 months.

Example 9

53.4 grams of liquid aluminum sulfate was blended with 54.2 grams of water and 23.6 grams of liquid aluminum hydroxychloride (17.5% $Al_2O_3$ and 41.7% basicity). 29.5 grams of powdered aluminum hydroxychloride (54.1% $Al_2O_3$ and 81.2% basicity) was added to this solution. The solution was stirred until a slightly hazy solution resulted. After filtration, this yielded a PACS solution of 15.0% $Al_2O_3$, 60.5% basicity, 7.5% sulfate that was stable and clear for over 6 months.

Example 10

32 grams of liquid aluminum sulfate was blended with 59 grams of water and 38 grams of liquid aluminum hydroxychloride (15.7% $Al_2O_3$ and 42.4% basicity). 31 grams of powdered aluminum hydroxychloride (50.1% $Al_2O_3$ and 77.2% basicity) was added to this solution. The solution was stirred until a slightly hazy solution resulted. After filtration, this yielded a PACS solution of 15.1% $Al_2O_3$, 60.5% basicity, 4.5% sulfate that was stable and clear for over 6 months.

Example 11

31.7 grams of liquid aluminum sulfate was blended with 61 grams of water and 34 grams of liquid aluminum hydroxyl chloride (15.7% $Al_2O_3$ and 42.4% basicity). 33 grams of powdered aluminum hydroxychloride (49.0% $Al_2O_3$ and 75.6% basicity) was added to this solution. The solution was stirred until a slightly hazy solution resulted. After filtration, this yielded a PACS solution of 15.1% $Al_2O_3$, 60.4% basicity, 4.5% sulfate that was stable and clear for over 6 months.

Example 12

Using a spray bottle, 52 grams of 79.4% basic and 52.7% $Al_2O_3$ AHC powder was sprayed with 104 grams of the less basic AHC produced in Example 3. 30 grams of commercial dry aluminum sulfate at 17.0% $Al_2O_3$ was added to this solution. The mixture was blended till uniform. This produced a dry composition of PACS of 27.7% $Al_2O_3$, 60% basic and 4.15% sulfate. This composition was then mixed with water to produce a PACS solution.

Example 13

70 grams of aluminum hydroxychloride solution (15.7% $Al_2O_3$, 42.6% basicity) was added to 58 grams of powdered aluminum hydroxychloride (54.1% $Al_2O_3$, 81.2% basic). The mixture was pasty and clumpy. The mixture was allowed to dry on a heated hotplate at 200° F. for 2 hours. The mixture appeared dried and was broken up with a spatula to produce a mixture of fine powder and coarse granules. This mixture was blended with 43.2 grams of granular aluminum sulfate. This material was allowed to sit for a week after which the mixture was added to 160 grams of water in a stirred beaker. The mixture was allowed to stir overnight and produced a slightly hazy solution that was clear after filtration. This yielded a PACS solution that was 15% $Al_2O_3$, 60.7% basicity and 6.2% sulfate.

All references cited herein are fully incorporated by reference. Having now fully described the invention, it will be understood by those of skill in the art that the invention may be practiced within a wide and equivalent range of conditions, parameters and the like, without affecting the spirit or scope of the invention or any embodiment thereof.

The invention claimed is:

1. A process for producing a polyaluminum chlorosulfate (PACS), the process comprising:
   a) providing an aluminum hydroxychloride solution having about 38-43% basicity;
   b) mixing aqueous aluminum sulfate with the aluminum hydroxychloride solution to form a solution of aluminum sulfate and aluminum hydroxychloride;
   c) providing solid aluminum hydroxychloride having formula (I):

$$Al_2(OH)_n(Cl)_{6-n}\text{-}zH_2O \qquad (I)$$

where $4.3 \le n \le 5.1$, and $0 < z \le 3$;
   d) mixing the solid aluminum hydroxychloride with the solution of aluminum sulfate and aluminum hydroxychloride to form an aqueous milky suspension, wherein, on a dry weight basis, the ratio of the aluminum hydroxychloride to the aluminum sulfate is 0.75-20 parts aluminum hydroxychloride to 1 part aluminum sulfate; and
   e) maintaining the milky suspension of step d) for a period sufficient to allow the milky suspension to form a clear to slightly turbid solution comprising the PACS having formula (II):

$$Al(OH)_{(3-x-2y)}(SO_4)_y \qquad (II)$$

wherein $1.78 < x < 2.02$, $0.03 < y < 0.45$, and $1.8 < x+y/2 < 2.1$;
   $Al:SO_4 = 2$ to 34; $Al:Cl = 0.9$ to 3.0; $Al:OH = 0.5$ to 0.6;
   the basicity is 55 to 75%;
   the average molecular weight of the PACS is greater than or equal to 95 and less than or equal to 111; and
   salts present in the PACS comprise 0-1.0% sodium chloride by weight and 0-1.0% sodium sulfate by weight.

2. The process of claim 1, wherein the aluminum hydroxychloride having formula (I) is between 73% to 83% basic.

3. The process of claim 1, wherein the aluminum hydroxychloride having formula (I) has 0 to 1.5 molecules of water of hydration.

4. The process of claim 1, wherein, in the PACS of formula (II):
   $x = 1.78$ to 1.82;
   $3-x-2y = 0.35$ to 1.1;
   $y = 0.065$ to 0.45; and
   $x+y/2 = 1.83$ to 2.02.

5. The process of claim 1, wherein, in the PACS of formula (II):
   $x = 1.95$ to 2.02;
   $3-x-2y = 0.6$ to 1.0;
   $y = 0.03$ to 0.20; and
   $x+y/2 = 1.95$ to 2.1.

6. The process of claim 1, wherein the PACS of formula (II) further comprises a sulfate content of 2.0-30% by weight in a dry state.

7. The process of claim 1, wherein the process is carried out at a temperature of 5-50 degrees centigrade.

8. The process of claim 1, wherein the process is carried out at a temperature of 10-40 degrees centigrade.

9. The process of claim 1, wherein the clear to slightly turbid solution formed in step e) is by mixing the milky suspension while gradually increasing its temperature until the clear to slightly turbid solution is obtained.

10. A process for producing a polyaluminum chlorosulfate (PACS), the process comprising:
    a) providing an aluminum hydroxychloride solution having about 38-43% basicity;
    b) mixing the aluminum hydroxychloride solution with solid aluminum hydroxychloride to form an aluminum hydroxychloride mixture, the solid aluminum hydroxychloride having formula (I):

$$Al_2(OH)_n(Cl)_{6-n}\text{-}zH_2O \qquad (I)$$

where $4.3 \le n \le 5.1$, and $0 < z \le 3$;
    c) mixing solid aluminum sulfate with the aluminum hydroxychloride mixture, in the presence of water, to form an aqueous milky suspension, wherein, on a dry weight basis, the ratio of the aluminum hydroxychloride to the aluminum sulfate is 0.75-20 parts aluminum hydroxychloride to 1 part aluminum sulfate; and
    d) maintaining the milky suspension of step c) for a period sufficient to allow the milky suspension to form a clear to slightly turbid solution comprising the PACS having formula (II):

$$Al(OH)_{(3-x-2y)}(SO_4)_y \qquad (II)$$

wherein $1.78 < x < 2.02$, $0.03 < y < 0.45$, and $1.8 < x+y/2 < 2.1$;
    $Al:SO_4 = 2$ to 34; $Al:Cl = 0.9$ to 3.0; $Al:OH = 0.5$ to 0.6;
    the basicity is 55 to 75%;
    the average molecular weight of the PACS is greater than or equal to 95 and less than or equal to 111; and
    salts present in the PACS comprise 0-1.0% sodium chloride by weight and 0-1.0% sodium sulfate by weight.

11. The process of claim 10, further comprising drying the aluminum hydroxychloride mixture before or after mixing with the solid aluminum sulfate.

12. The process of claim 10, wherein the aluminum hydroxychloride having formula (I) is between 73% to 83% basic.

13. The process of claim 10, wherein the aluminum hydroxychloride having formula (I) has 0 to 1.5 molecules of water of hydration.

14. The process of claim 10, wherein, in the PACS of formula (II):
    $x = 1.78$ to 1.82;
    $3-x-2y = 0.35$ to 1.1;
    $y = 0.065$ to 0.45; and
    $x+y/2 = 1.83$ to 2.02.

15. The process of claim 10, wherein, in the PACS of formula (II):
    $x = 1.95$ to 2.02;
    $3-x-2y = 0.6$ to 1.0;
    $y = 0.03$ to 0.20; and
    $x+y/2 = 1.95$ to 2.1.

16. The process of claim 10, wherein the PACS of formula (II) further comprises a sulfate content of 2.0-30% by weight in a dry state.

17. The process of claim 10, wherein the process is carried out at a temperature of 5-50 degrees centigrade.

18. The process of claim 10, wherein the process is carried out at a temperature of 10-40 degrees centigrade.

19. The process of claim 10, wherein the clear to slightly turbid solution formed in step e) is by mixing the milky suspension while gradually increasing its temperature until the clear to slightly turbid solution is obtained.

20. A package comprising two components for water treatment, wherein the components include:
a) solid aluminum sulfate; and
b) a mixture of an aluminum hydroxychloride solution having about 38-43% basicity and a solid aluminum hydroxychloride having formula (I):

$$Al_2(OH)_n(Cl)_{6-n} \cdot zH_2O \quad (I)$$

where $4.3<n<5.1$, and $0<z<3$, wherein, on a dry weight basis, the ratio of the aluminum hydroxychloride to the aluminum sulfate is 0.75-20 parts aluminum hydroxychloride to 1 part aluminum sulfate such that, upon the addition of water, a solution may be formed comprising a polyaluminum chlorosulfate (PACS) of formula (II):

$$Al(OH)_{(3-x-2y)}(SO_4)_y \quad (II)$$

wherein $1.78<x<2.02$, $0.03<y<0.45$, and $1.8<x+y/2<2.1$;
Al:$SO_4$=2 to 34; Al:Cl=0.9 to 3.0; Al:OH=0.5 to 0.6;
the basicity is 55 to 75%;
the average molecular weight of the PACS is greater than or equal to 95 and less than or equal to 111; and
salts present in the PACS comprise 0-1.0% sodium chloride by weight and 0-1.0% sodium sulfate by weight.

* * * * *